United States Patent [19]

Stein et al.

[11] Patent Number: 4,806,427
[45] Date of Patent: Feb. 21, 1989

[54] PROCESS FOR THE PRODUCTION OF CATALYSTS FOR THE REDUCTION OF NITROGEN OXIDES FROM EXHAUST GASES AND SIMILAR CHEMICAL AIR CLEANING PROCESSES

[75] Inventors: Hermann Stein, Bad Dûrkheim; Hartmut Kainer, Wiesbaden; Daniel Grimm, Schlangenbad, all of Fed. Rep. of Germany

[73] Assignee: Didier-Werke AG, Wiesbaden, Fed. Rep. of Germany

[21] Appl. No.: 94,081

[22] Filed: Sep. 4, 1987

Related U.S. Application Data

[63] Continuation of Ser. No. 887,366, Jul. 17, 1986, abandoned.

[30] Foreign Application Priority Data

Jul. 24, 1985 [DE] Fed. Rep. of Germany ....... 3526383

[51] Int. Cl.$^4$ .................. B01J 29/04; B01J 37/00; B01J 35/00
[52] U.S. Cl. .................... 502/60; 502/305; 502/316; 502/325; 502/527
[58] Field of Search ............... 502/316, 527, 305, 325, 502/60

[56] References Cited

U.S. PATENT DOCUMENTS

| 3,956,192 | 5/1976 | Nicolai | 252/477 R |
| 4,040,981 | 8/1977 | Inaba et al. | 502/335 |
| 4,285,838 | 8/1981 | Ishida et al. | 502/316 |
| 4,517,219 | 5/1985 | Hajek | 427/8 |

FOREIGN PATENT DOCUMENTS

| 674711 | 11/1963 | Canada | 502/527 |
| 19989 | 12/1980 | European Pat. Off. | 502/316 |
| 2353640 | 5/1978 | Fed. Rep. of Germany . | |
| 2846476 | 1/1981 | Fed. Rep. of Germany . | |
| 2927246 | 11/1983 | Fed. Rep. of Germany . | |
| 66492 | 6/1975 | Japan | 502/527 |
| 33991 | 3/1978 | Japan | 502/527 |
| 132638 | 10/1980 | Japan | 502/527 |
| 19400 | 2/1982 | Japan | 502/527 |

Primary Examiner—Carl F. Dees
Attorney, Agent, or Firm—Nils H. Ljungman

[57] ABSTRACT

The invention relates to a process for the production of catalysts for the reduction of nitrogen oxides from exhaust gases and similar chemical air cleaning processes, in which a catalytically active material is deposited and bonded on a carrier made of metal, preferably stainless steel. The carrier is preferably in the form of a perforated metal plate, or of rib mesh, or a grid, preferably fabric, honeycombed or knitted material made of metal wire, or a similar material with a high specific surface. To simplify manufacturing and to improve the characteristics of the catalysts, the invention proposes the use of an acid which etches the surface of the metal carrier as the binder for the catalytically active material.

21 Claims, 1 Drawing Sheet

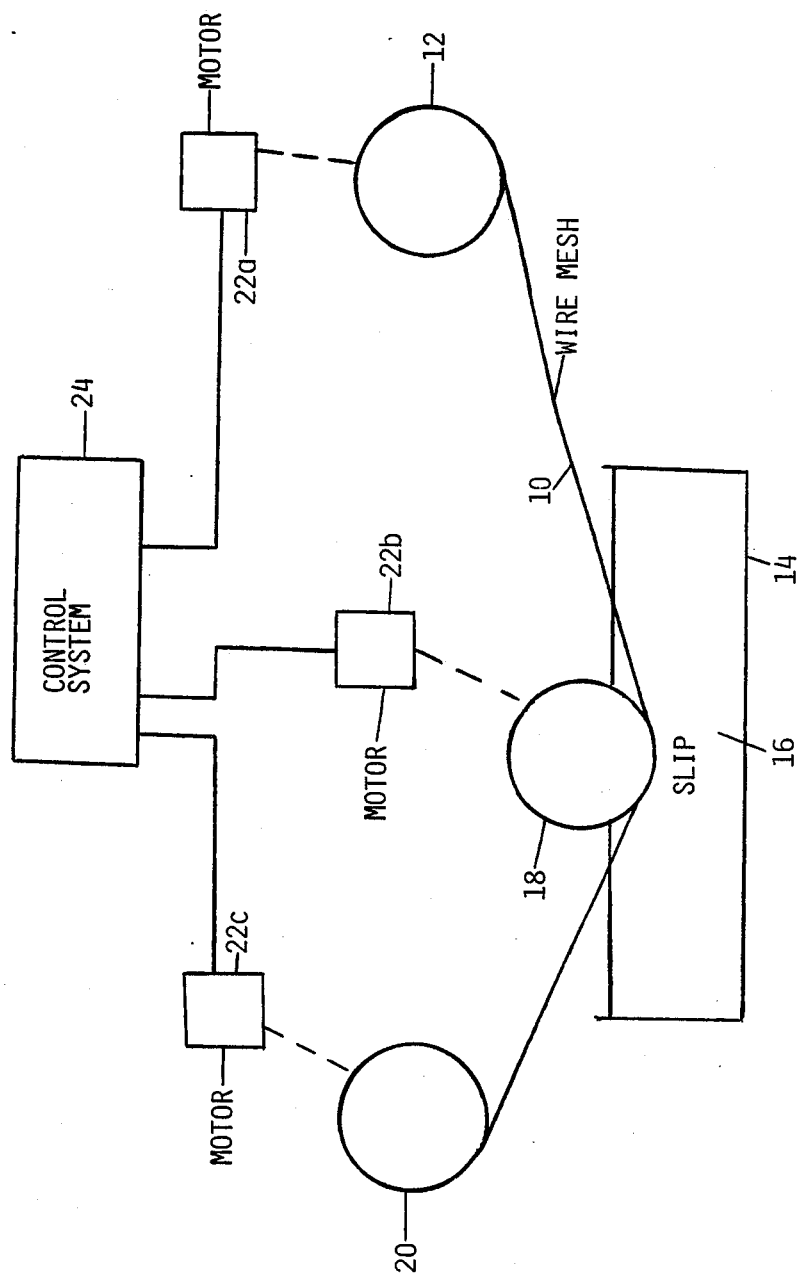

PROCESS FOR THE PRODUCTION OF CATALYSTS FOR THE REDUCTION OF NITROGEN OXIDES FROM EXHAUST GASES AND SIMILAR CHEMICAL AIR CLEANING PROCESSES

This application is a continuation of U.S. application Ser. No. 887,366 filed on July 17, 1986, now abandoned.

BACKGROUND OF THE INVENTION

1. Field of the Invention

The invention relates to a process for the production of catalysts for the reduction of nitrogen oxides from exhaust gases and similar chemical air cleaning processes, in which a catalytically active material is deposited and bonded on a carrier made of metal, preferably stainless steel, in the form of a perforated metal plate, of wire mesh, woven, honeycombed or knitted material made of metal wire, or a similar material with a high specific surface area.

2. Description of the Prior Art

German Patent Publication Published for Opposition Purposes No. DE-AS 23 53 640, which is equivalent to U.S. Pat. No. 3,956,192, entitled "Catalyst Carrier", describes a catalyst carrier with a blank comprising metal wire distributed as uniformly as possible over the volume between support mats, whereby the blank exhibits several layers packed on top of one another and attached to one another consisting of a woven, honeycombed or knitted endless alloy wire, heat resistant up to 800° C.

German Patent Publication Published for Opposition Purposes No. DE-AS 28 46 476 describes a process for the manufacture of sintered blanks which contain titanium dioxide, an active component, and molybdenum oxide as binders for the titanium dioxide, whereby the vaporous molybdenum oxide is deposited on pulverized titanium oxide in an atmosphere of molybdenum oxide vapor at temperatures from 460° C. to 650° C. In this manner, a pulverized mixture is produced which contains the pulverized titanium oxide with the molybdenum oxide deposited on it and the active components, and a quantity of water is added to it so that a viscous mixture is formed. A blank is produced from the kneaded mixture and the blank is calcined to form a sintered product. In this proposal, for example, a plate structure is formed by applying a viscous material, obtained by adding 25 to 35 percent by weight, preferably 24 to 28 percent by weight, water to the pulverized mixture on a porous steel plate. Other plate structures can also be formed, by applying viscous material obtained by adding 20 to 30 percent by weight water to various metal wire meshes.

German Patent No. DE-PS 28 53 023 describes a plate-shaped catalyst, comprising a carrier, a metal intermediate layer applied to it, and a catalytically active component of the prior art deposited on it suitable for the reduction of oxides of nitrogen, $NO_x$, in an exhaust gas, whereby both surfaces of the plate are roughened by spraying these on molten metal. Catalytic substances which can be used for the reduction of the oxides of nitrogen, $NO_x$, contained in an exhaust gas by means of ammonia include titanium and vanadium, or titanium, tungsten and one or more of the elements vanadium, molybdenum or iron. Such catalytic substances were processed prior to the proposal of DE-PS 28 53 023, for example, as hydroxide or water-soluble salt into a suspension or paste, which was combined as necessary with a suitable carrier material, to apply the suspension or paste obtained in the form of a coating to a substrate for the catalyst, and then drying or sintering it, to bind it for use to the substrate. Catalytic substances were also bonded to the substrate in the form of oxides or sulfates. DE-PS 28 53 023 was intended to demonstrate that portions of the catalytically active substances deposited on the opposite sides of the carrier plate are in connection with one another through the perforation, to make certain that the catalytically active substance deposited on the carrier plate adheres firmly to it.

German Patent No. DE-PS 29 27 246 describes a plate-shaped catalyst for the reduction of nitrogen oxides in exhaust gases with a porous, firmly-adhering metal oxide carrier deposited on metal. A catalytically active component is then applied to the carrier, whereby the catalyst is manufactured by the application of a suspension containing particulate titanium oxide and colloidal silicic acid in a weight ratio of 1:10 to 10:1 on a metal mesh with an open mesh width of 0.147 millimeters to 1.651 millimeters, and whereby the active component is incorporated before, during or after the application. The suspension is thereby formed out of finely-divided titanium oxide and the binder containing the colloidal silicic acid, and is deposited on the metal mesh. The resulting carrier is then dried and immersed in a solution of a salt of the active component, and then dried and fired, if necessary. It is also possible to immerse the metal grid in a coating bath, which contains titanium oxide and binder, the metal grid is then dried, and the carrier formed is immersed in a solution of a salt of the active component. It can then be dried and fired if necessary. It is also possible to immerse the metal grid in a coating bath which contains titanium oxide and binder, then to dry the metal grid and immerse the carrier thus formed in a solution of a salt of the active component, and then to dry and fire it if necessary.

All the above-cited documents are incorporated herein by reference as if set forth herein in their entirety.

The processes of the prior art for the manufacture of catalysts thus entail a comparatively high manufacturing expense to produce catalysts which meet the requirements of large open flow cross sections and large surface area relative to volume, although the problem of the adherence of the catalytically active material is still not solved in a satisfactory manner.

OBJECT OF THE INVENTION

The object of the present invention is a simpler method for the production of catalysts which offer a high degree of operational safety and reliability with the largest possible free flow cross section and the largest possible surface area in relation to volume.

SUMMARY OF THE INVENTION

This object is achieved by the invention in that the binder of the catalytically active material used is an acid which etches the surface of the metallic carrier. The binder can thereby consist exclusively of this acid, or contain the acid as one component among several, preferably other binders, fillers etc. The use of such etching acids makes possible an economical manufacturing process and achieves an acceptable bond between the catalytically active material and the metal surface of the catalyst carrier. Such a catalyst can therefore be used with a high degree of operational safety and reliability.

The catalysts manufactured in this manner have a high flexibility and stability in an exhaust gas current. Such catalysts can then be used easily in the optimum configurations in exhaust gas ducts, flow reactors, air preheaters, recuperators, etc. With them, open flow cross sections of more than 80% can be achieved. The manner in which the catalytically active material adhere to the metal surface also opens the way for the use of a broad range of catalyst materials over wide temperature ranges to an extent heretofore not possible.

The process according to the invention is applied, for example, in one particular embodiment, by coating the carrier with a mixture of the acid and the catalytically active material, and any other components, in a manner according to the prior art, for example, by painting or spraying the mixture containing acid on the carrier, or by immersing the carrier in the mixture containing acid.

In many cases, in which the catalytically active material is present in the form of powder, for example, as ceramic powder, the carrier can be coated with the mixture of acid and the catalytically active material by first immersing the carrier in the acid and then dusting it with the pulverized catalytically active material.

In the process according to the invention, the catalytically active material can be natural raw materials such as iron ore, chromium ore or zeolite and/or synthetic materials and/or industrial waste materials, such as slags, slurries or scale.

It is also possible with the manufacturing process according to the invention to add activators, for example, elements or oxides of the seventh or eighth groups, and/or inhibitors to the mixture of the acid and the catalytically active material.

For the practical application of the process according to the invention and the use of the catalysts obtained, it has proven to be particularly appropriate to use a stainless steel woven, honeycomb or knitted wire mesh as the carrier, with a low total thickness of approximately 0.4 millimeters to about 0.6 millimeters, for example, preferably, approximately 0.5 millimeters, before coating. Such carrier meshes are commercially available, made of heat-resistant or acid-resistant steels, and can be used advantageously in the context of the invention. The adherence of the catalytically active material is good and the efficiency of catalysts manufactured in this manner is high. They can easily be formed into any desired shape.

The carrier is thereby preferably coated so that the coated carrier has a total thickness of approximately 0.8 millimeters to 1.0 millimeters, for example, preferably, approximately 0.9 millimeters. This achieves the objective of operational safety and reliability of the catalyst produced and eliminates or minimizes the loss of catalytically active material during shaping or use.

In addition, in the context of the invention, the coated carrier can be dried and/or tempered and/or fired-up to the limit-of-use temperature of the metal carrier used, for example, preferably, stainless steel fabric.

BRIEF DESCRIPTION OF THE DRAWING

The accompanying Figure shows a schematic representation of a coating process for coating a carrier.

DESCRIPTION OF THE PREFERRED EMBODIMENTS

The process according to the invention of the production of catalysts is explained in greater detail below with reference to the embodiments:

1. Example for the Immersion Process:
   Manufacture of a slip.

In 13 percent by weight water (in relation to the total amount), 65 percent by weight solid matter, for example, iron ore or chromium ore or a mixture of the two components, is dispersed by the addition of 0.2–1.0 percent by weight of an acid-stable liquefier, which can be a polyelectrolyte or a boundary layer active ester.

Then 22 percent by weight of 50% sulfuric acid, that is, at a concentration of 50%, is added.

Sample composition:
10–15 percent by weight water
0.2–1.0 percent by weight liquefier
65 percent by weight solid matter (iron ore/chromium ore)
20–25 percent by weight $H_2SO_4$ (50%)

The water can be replaced in stages by a lower-percentage concentration sulfuric acid.

Example of a complete replacement:
35 percent by weight $H_2SO_4$ having a concentration of 25%
0.2–1.0 percent by weight liquefier
65 percent by weight solid matter (iron ore/chromium ore)

The slip is placed in suitable immersion vessel, and the blank, for example, an endless or very long strip, is drawn through the immersion bath.

To prevent air bubbles from being introduced into the immersion bath, the wire mesh to be coated should be introduced into the immersion bath at the most obtuse or oblique angle possible. The viscosity of the slip during the immersion process is between 50 cP (centipoise) and 300 cP, and preferably between 70 cP and 150 cP.

The accompanying Figure shows wire mesh 10 wound around a drum 12. The wire mesh 10 is fed through a vessel 14 filled with a slip 16 and is guided therethrough by another drum 18. The coated wire mesh 10 is preferably taken up on a third drum 20 or alternatively cut into lengths. Motors 22a, 22b and 22c power the drums 12, 18 and 20 respectively and are controlled by a control system 24, which keeps the wire mesh 10 substantially taut.

Immediately thereafter, the blank is continuously tempered, preferably up to 450° C., whereby a temperature increase of approximately 50° C. a minute is desired, with a hold time of five minutes or more at the final temperature.

If a continuous strip is used, the desired shapes are cut after tempering.

2. Example of the Spray Process:
   A slip is produced as described in Example 1.

With an arrangement of two spray nozzles, the slip is finely sprayed so that a solid wall of spray is achieved, through which the blanks or the continuous strips are continuously transported, resulting in that a bubble-free coating is deposited.

Then, analogous to Example 1, the blanks are tempered and, if endless strip is used, the desired shapes are cut after tempering.

To control the surface roughness and the porosity of the surface, during manufacture of the slip in Example 1 and 2, approximately 0.5% to 2% of an acid-stable foaming agent is added to the water, preferably in the proportion of 1%, such as a polyvinyl alcohol.

3. Example of the Powdering of an Acid-Wetted Wire Fabric:

The wetting of the wire fabric is preferably achieved by immersing or spraying the blanks with 50% to 98% sulfuric acid.

Immediately thereafter, it is powdered with the appropriate solid material, for example, iron ore dust or chromium ore dust, with a fineness of less than 0.1 millimeters, and preferably 10-50 microns.

The powdering is done in batches in a fluidized bed, in which the blanks are exposed to a mixture of air and ore fines, whereby the dust adheres to the surfaces of the blank until the bonding strength of the acid is exhausted.

To support the deposition process, an electrical field can also be created in the fluidized bed, whereby the wire mesh blanks to be coated assume the role of the passive electrode.

An example of such coating is found in U.S. Pat. No. 4,517,219, entitled "Electrostatic Powder Coating Control Apparatus and Method" and is incorporated herein by reference as if the entire contents thereof were fully set forth herein.

Analogous to Example 1, a tempering is then conducted up to 450° C.

An example of the polyelectrolyte found on page 6, line 27, is DOLAPIX, manufactured by Zschimmer & Schwarz Chemische Fabriken GmbH & Co., D-5420 Lahnstein/Rhein, Federal Republic of Germany. Different forms of DOLAPIX, such as, DOLAPIX PCN, DOLAPIX PC 67, DOLAPIX CA and DOLAPIX CE 64, may be used.

An example of the boundary layer active ester found on page 6, lines 27-28, is DOLAPIX ET 85, also manufactured by Zschimmer & Schwarz Chemische Fabriken GmbH & Co.

Another example of an electrolyte usable in the practice of this invention is DOLAFLUX E 18, manufactured by the same manufacturer as above.

Further examples of polyelectrolytes are DOLAPIX PC 25 and DOLAPIX PC 33, manufactured by the same manufacturer as above.

Compositions of the DOLAFLUX and DOLAPIX products, are the following:

DOLAFLUX E 18:
  34% $Na_4P_2O_7$ (sodium phosphate)
  66% tannic acid (containing extracts of bark and tannin).

DOLAPIX CA, PCN, PC 67, PC 25 and PC 33:
  an aqueous solution with a concentration of between 25% and 45% alkaline salts or acrylic acids.

DOLAPIX CE 64, ET 85:
  polyvalent carbonic acid of an ethylene adduct.

The invention as described hereinabove in the context of the preferred embodiment is not to be taken as limited to all of the provided details thereof, since modifications and variations thereof may be made without departing from the spirit and scope of the invention.

What is claimed is:

1. Process for production of a catalytic member having a catalytically active material deposited on carrier means, said process comprising the steps of:
   applying binder for binding said catalytically active material to said carrier means, said binder comprising an acid etchant binder;
   coating said carrier means with said catalytically active material while said binder is in a wetted state; and
   treating said catalytic member to stabilize said coating.

2. The process according to claim 1 wherein said carrier means is made of metal.

3. The process according to claim 2 wherein said metal carrier means has openings extending therethrough.

4. The process according to claim 1 wherein said carrier means is coated with a mixture of said etchant and said catalytically active material whereby said etching and said coating occur contemporaneously.

5. The process according to claim 2 wherein said carrier means is coated with a mixture of said etchant and said catalytically active material whereby said etching and said coating occur contemporaneously.

6. The process according to claim 3 wherein said carrier means is coated with a mixture of said etchant and said catalytically active material whereby said etching and said coating occur contemporaneously.

7. The process according to claim 4 wherein said coating of said carrier means is done by one of the members of the group consisting essentially of: painting, spraying, immersion and a combination of the other members of the group.

8. The process according to claim 7 wherein said coating of said carrier member is followed by:
   dusting pulverized catalytically active material on said carrier member.

9. The process according to claim 1 wherein said catalytical active material is chosen from a member of the group consisting essentially of: iron ore, chromium ore, zeolite and combinations thereof.

10. The process according to claim 8 wherein said catalytically active material is chosen from a member of the group consisting essentially of: iron ore, chromium ore, zeolite and combinations thereof.

11. The process according to claim 4 wherein said mixture includes a member of the group consisting essentially of: an activator, and inhibitor and combinations ofthe other members of the group.

12. The process according to claim 10 wherein said mixture includes a member of the group consisting essentially of: an activator, and inhibitor and combinations of the other members of the group.

13. The process according to claim 3 wherein said metal carrier means having openings is made from stainless steel and a shape of said carrier means is chosen from a member of the group consisting essentially of: wire mesh, fabric and honeycomb material.

14. The process according to claim 13 wherein said carrier means has a thickness of about 0.4 millimeters to about 0.6 millimeters, before being coated.

15. The process according to claim 6 wherein said metal carrier means having openings is made from stainless steel and a shape of said carrier means is chosen from a member of the group consisting essentially of: wire mesh, fabric and honeycomb material.

16. The process according to claim 15 wherein said carrier means has a thickness of about 0.4 millimeters to about 0.6 millimeters, before being coated.

17. The process according to claim 12 wherein said metal carrier means having openings is made from stainless steel and a shape of said carrier means is chosen from a member of the group consisiing essentially of: wire mesh, fabric and honeycomb material;
   said carrier means has a thickness of about 0.4 millimeters to about 0.6 millimeters, before being coated.

18. The process according to claim 13 wherein said carrier has a total thickness of about 0.8 millimeters to about 1.00 millimeters, after being coated.

19. The process according to claim 18 wherein said total thickness is about 0.9 millimeters.

20. The process according to claim 1 wherein said treating of said catalytic member to stabilize said coating is chosen from a member of the group consisting essentially of: drying, tempering, firing and a combination of the other members of this group.

21. The process, according to claim 1, wherein said acid etchant binder contains sulfuric acid.

* * * * *